United States Patent
Trela et al.

(10) Patent No.: US 12,556,009 B2
(45) Date of Patent: Feb. 17, 2026

(54) RECONFIGURABLE BATTERY SYSTEM FOR EFFICIENT CHARGING AND DISCHARGING

(71) Applicant: The Boeing Company, Chicago, IL (US)

(72) Inventors: John A. Trela, Seattle, WA (US); Glen M. Brown, Woodinville, WA (US); Shengyi Liu, Sammamish, WA (US)

(73) Assignee: THE BOEING COMPANY, Arlington, VA (US)

( * ) Notice: Subject to any disclaimer, the term of this patent is extended or adjusted under 35 U.S.C. 154(b) by 350 days.

(21) Appl. No.: 17/468,161

(22) Filed: Sep. 7, 2021

(65) Prior Publication Data

US 2022/0231516 A1    Jul. 21, 2022

Related U.S. Application Data

(60) Provisional application No. 63/139,271, filed on Jan. 19, 2021.

(51) Int. Cl.
| | |
|---|---|
| *H02J 7/00* | (2006.01) |
| *B60L 53/00* | (2019.01) |
| *B60L 58/12* | (2019.01) |

(52) U.S. Cl.
CPC ............ *H02J 7/0013* (2013.01); *B60L 53/00* (2019.02); *B60L 58/12* (2019.02); *H02J 7/0048* (2020.01); *H02J 7/00712* (2020.01)

(58) Field of Classification Search
None
See application file for complete search history.

(56) References Cited

U.S. PATENT DOCUMENTS

| | | | | |
|---|---|---|---|---|
| 6,323,623 | B1 * | 11/2001 | Someya | H02J 7/0048 320/121 |
| 7,898,223 | B2 * | 3/2011 | Takeda | H02M 3/07 320/167 |

(Continued)

FOREIGN PATENT DOCUMENTS

| | | | |
|---|---|---|---|
| CN | 111452671 A | 7/2020 | |
| WO | WO-2014156390 A1 * | 10/2014 | H02J 7/0024 |

OTHER PUBLICATIONS

WO2014156390 translation, Ida, Battery System for Industrial Machine (Year: 2014).*

(Continued)

*Primary Examiner* — Tynese V McDaniel
(74) *Attorney, Agent, or Firm* — Moore IP Law

(57) ABSTRACT

A reconfigurable battery system is disclosed. The reconfigurable battery system comprises a reconfigurable battery cell array, a controller, and a bus switch. The battery cell array is configured to operate in a first discharge mode, a second discharge mode, or a charge mode. The battery cell array includes a plurality of battery cells arranged as at least a first column of battery cells between a second battery terminal and a first battery terminal and a switch between each battery cell within the first column of battery cells. The bus switch is in signal communication with the battery cell array at the first battery terminal and is configured to select between electrically connecting the first battery terminal to a normal voltage bus or a high-voltage bus.

20 Claims, 7 Drawing Sheets

(56) References Cited

U.S. PATENT DOCUMENTS

| | | | | |
|---|---|---|---|---|
| 9,893,384 | B2* | 2/2018 | Velderman | H02J 7/02 |
| 9,910,471 | B1* | 3/2018 | Marr | G06F 1/26 |
| 10,971,941 | B2* | 4/2021 | Krieg | H02J 7/0048 |
| 11,451,070 | B2* | 9/2022 | Sun | H02J 7/0013 |
| 2001/0054877 | A1* | 12/2001 | Kinoshita | H02J 7/0014 |
| | | | | 320/112 |
| 2003/0128013 | A1* | 7/2003 | Okamura | H02J 7/0024 |
| | | | | 320/166 |
| 2005/0212493 | A1* | 9/2005 | Yamaguchi | H02J 7/0024 |
| | | | | 320/166 |
| 2008/0072859 | A1* | 3/2008 | Esaka | H02J 7/0019 |
| | | | | 320/117 |
| 2008/0150356 | A1* | 6/2008 | Breit | H02J 1/10 |
| | | | | 307/18 |
| 2008/0211451 | A1* | 9/2008 | Zhang | H02S 40/32 |
| | | | | 320/101 |
| 2011/0001456 | A1* | 1/2011 | Wang | H02J 7/0016 |
| | | | | 320/117 |
| 2012/0013180 | A1* | 1/2012 | Muto | B60L 58/21 |
| | | | | 307/9.1 |
| 2012/0161730 | A1* | 6/2012 | Farnsworth | H02M 3/07 |
| | | | | 323/272 |
| 2013/0200860 | A1* | 8/2013 | Takeda | H02J 7/34 |
| | | | | 320/167 |
| 2013/0320926 | A1* | 12/2013 | Kerfoot, Jr. | H02J 7/0024 |
| | | | | 320/117 |
| 2014/0145513 | A1* | 5/2014 | Kapoor | H02J 7/345 |
| | | | | 307/104 |
| 2014/0152262 | A1* | 6/2014 | Nomoto | H01M 10/482 |
| | | | | 320/126 |
| 2015/0298556 | A1* | 10/2015 | Sakata | H01M 10/441 |
| | | | | 307/10.1 |
| 2016/0365740 | A1* | 12/2016 | Wang | H03K 17/687 |
| 2017/0170671 | A1* | 6/2017 | Mergener | B25F 5/00 |
| 2017/0187184 | A1* | 6/2017 | Nakayama | H02J 7/0024 |
| 2017/0201102 | A1* | 7/2017 | Hikosaka | H02J 7/02 |
| 2018/0056798 | A1* | 3/2018 | Syouda | B60L 58/15 |
| 2018/0321326 | A1* | 11/2018 | Tanaka | G01R 31/3842 |
| 2019/0084438 | A1* | 3/2019 | Takamatsu | B60L 58/19 |
| 2019/0199108 | A1* | 6/2019 | Hiroe | H01M 10/441 |
| 2019/0225109 | A1* | 7/2019 | Ono | B60L 3/0015 |
| 2019/0229542 | A1* | 7/2019 | Dunn | H01M 16/006 |
| 2019/0288528 | A1* | 9/2019 | Greetham | B60L 58/19 |
| 2020/0036047 | A1* | 1/2020 | Aikens | H01M 10/425 |
| 2020/0076329 | A1* | 3/2020 | Kim | H02N 2/183 |
| 2020/0091738 | A1* | 3/2020 | Kim | H02J 50/001 |
| 2021/0013726 | A1* | 1/2021 | Hill | B25F 5/00 |
| 2021/0020998 | A1* | 1/2021 | Musafia | H01M 10/48 |
| 2021/0091576 | A1* | 3/2021 | Zhang | H02J 7/0024 |
| 2021/0129700 | A1* | 5/2021 | Song | B60L 58/19 |
| 2021/0218251 | A1* | 7/2021 | Chettiar | H02J 7/35 |
| 2022/0029431 | A1* | 1/2022 | McLean | B60L 50/66 |
| 2022/0194634 | A1* | 6/2022 | Soendker | B64G 1/411 |
| 2022/0278534 | A1* | 9/2022 | Kim | H01M 10/441 |
| 2022/0294236 | A1* | 9/2022 | Ha | H01M 10/425 |
| 2022/0355703 | A1* | 11/2022 | Fatemi | H02J 7/0024 |
| 2023/0001797 | A1* | 1/2023 | Makio | H02J 7/0019 |
| 2023/0083686 | A1* | 3/2023 | Ruan | H02J 7/007182 |
| | | | | 320/117 |

OTHER PUBLICATIONS

Requisition by the Examiner with Examination Search Report for application No. CA 3,145,711 dated Dec. 4, 2024, pp. 1-11.
Japanese Office Action No. 2022 to 005755 dated Nov. 28, 2025, pp. 1-8.

* cited by examiner

RECONFIGURABLE BATTERY SYSTEM FOR EFFICIENT CHARGING AND DISCHARGING

CROSS REFERENCE TO RELATED APPLICATION

The present invention claims priority to U.S. Provisional Patent Application Ser. No. 63/139,271, filed Jan. 19, 2021, which is incorporated herein by reference in its entirety.

BACKGROUND

Technical Field

The field of the present disclosure relates generally to battery systems, and more specifically, efficient battery systems.

Prior Art

Electric vehicles such as electric automobiles, trucks, marine vehicles, and aircraft are becoming more common in present society. All of these vehicles include batteries that need fast charging times that are comparable to the re-fueling process times of petroleum-based vehicles. Unfortunately, the rate of charge of batteries is primarily limited by the charge transportation process and the chemical reaction process (i.e., oxidation-reduction) within the battery. Fast charging exceeding this limit results in reduced charging capacity with potentially excessive heat generation that may cause thermal degradation of the battery.

In addition, as batteries discharge, their battery voltages decrease. Near the end of a battery's discharge capacity, the battery voltage can be as low as 40% of its voltage at a fully charged state. At this lower voltage, the battery current becomes large under a constant power load. This increased current produces significantly more heat at the battery, and at any equipment electrically connected to the battery, as compared to the heat produced when the battery voltage is higher and near the fully charged state of the battery. The adverse effects of this increased heat production include, for example, loss of energy (lower efficiency), increased system cooling load (consuming more power), increased equipment current ratings (heavier), and accelerated equipment degradation (short cycle life). As such, there is a need for a system and method that address these problems.

SUMMARY

A reconfigurable battery system is disclosed. The reconfigurable battery system comprises a battery cell array and a bus switch. The battery cell array configured to operate in a first discharge mode, a second discharge mode, and a charge mode. The battery cell array includes a plurality of battery cells arranged as at least a first column of battery cells between a second battery terminal and a first battery terminal and a switch between each battery cell within the first column of battery cells. The bus switch in signal communication with the battery cell array at the first battery terminal and is configured to select between electrically connecting the first battery terminal to a normal voltage bus or a high-voltage bus. The battery cell array may also include a plurality of battery cells arranged as a plurality of columns of battery cells between the second battery terminal and the first battery terminal and the switch may be between each battery cell within each column of the plurality of columns of battery cells.

In an example of operation, the reconfigurable battery system may perform a method that comprises electrically connecting the first battery terminal to the normal voltage bus when the battery cell array is configured to operate in the first discharge mode and electrically connecting each battery cell in the first column of battery cells into a configuration that forms an electrical parallel connection between the first battery terminal and second battery terminal, where each battery cell, of the first column of battery cells, is in parallel between the first battery terminal and second battery terminal. The method also comprises electrically connecting the first battery terminal to a high-voltage bus when the battery cell array is configured to operate in the second discharge mode and electrically connecting each battery cell in the first column of battery cells into a configuration that forms an electrical series connection between the first battery terminal and second battery terminal, where the electrical series connection includes all the battery cells of the first column of battery cells. Moreover, the method also comprises electrically connecting the first battery terminal to the high-voltage bus when the battery cell array is configured to operate in the charge mode and electrically connecting each battery cell in the first column of battery cells into a configuration that forms an electrical series connection between the first battery terminal and second battery terminal, where the electrical series connection includes all the battery cells of the first column of battery cells.

Other devices, apparatuses, systems, methods, features, and advantages of the invention will be or will become apparent to one with skill in the art upon examination of the following figures and detailed description. It is intended that all such additional devices, apparatuses, systems, methods, features, and advantages be included within this description, be within the scope of the invention, and be protected by the accompanying claims.

BRIEF DESCRIPTION OF THE FIGURES

The invention may be better understood by referring to the following figures. The components in the figures are not necessarily to scale, emphasis instead being placed upon illustrating the principles of the invention. In the figures, like reference numerals designate corresponding parts throughout the different views.

DETAILED DESCRIPTION

A reconfigurable battery system is disclosed. The reconfigurable battery system comprises a battery cell array and a bus switch. The battery cell array is configured to operate in a first discharge mode, a second discharge mode, and charge mode. The battery cell array includes a plurality of battery cells arranged as (1) at least a first column of battery cells between a second battery terminal and a first battery terminal and (2) a switch between each battery cell within the first column of battery cells. The bus switch is in signal communication with the battery cell array at the first battery terminal and is configured to select between electrically connecting the first battery terminal to a normal voltage bus or a high-voltage bus. The battery cell array may also include a plurality of battery cells arranged as a plurality of columns of battery cells between the second battery terminal and the first battery terminal, and the switches may be between each battery cell within each column of the plurality of columns of battery cells.

In an example of operation, the reconfigurable battery system may perform a method that comprises electrically connecting the first battery terminal to the normal voltage bus when the battery cell array is configured to operate in the first discharge mode and electrically connecting each battery cell in the first column of battery cells into a configuration that forms an electrical parallel connection between the first battery terminal and second battery terminal, where each battery cell, of the first column of battery cells, is in parallel between the first battery terminal and second battery terminal. The method also comprises electrically connecting the first battery terminal to a high-voltage bus when the battery cell array is configured to operate in the second discharge mode and electrically connecting each battery cell in the first column of battery cells into a configuration that forms an electrical series connection between the first battery terminal and second battery terminal, where the electrical series connection includes all the battery cells of the first column of battery cells. Moreover, the method also comprises electrically connecting the first battery terminal to the high-voltage bus when the battery cell array is configured to operate in the charge mode and electrically connecting each battery cell in the first column of battery cells into a configuration that forms an electrical series connection between the first battery terminal and second battery terminal, where the electrical series connection includes all the battery cells of the first column of battery cells.

Figure 1:
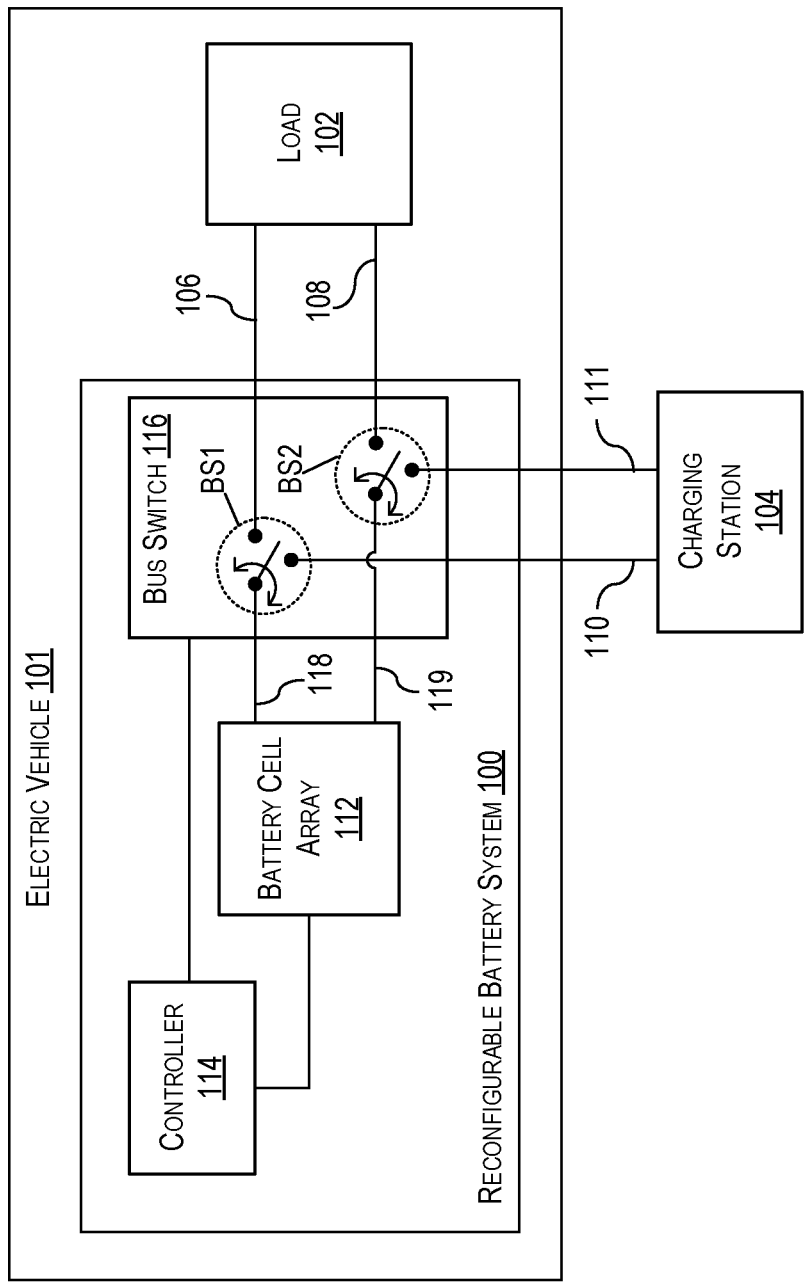
FIG. 1 is a system block diagram of an example of an implementation of a reconfigurable battery system in accordance with the present disclosure.

In FIG. 1, a system block diagram of an example of an implementation of the reconfigurable battery system 100 is shown in accordance with the present disclosure. The reconfigurable battery system 100 may be part of, for example, an electric vehicle 101. The reconfigurable battery system 100 is configured to be in signal communication with an electric vehicle load (generally referred to simply as a "load") 102 and a charging station 104 via a plurality of electrical connections that include a normal voltage bus 106, a load bus 108, a high-voltage bus 110, and a negative bus 111. The reconfigurable battery system 100 may include a battery cell array 112, a controller 114, and a bus switch 116. The controller 114 is in signal communication with the battery cell array 112 and the bus switch 116. The bus switch 116 is also in signal communication with the battery cell array 112, the load 102, and the charging station 104 via a first battery terminal 118, a second battery terminal 119, the normal voltage bus 106, the load bus 108, the high-voltage bus 110, and the negative bus 111, respectively. In this example, the first battery terminal 118 may be a positive polarity terminal and the second battery terminal 119 may be a negative polarity terminal.

In this example, load 102 is a device that acts as an electrical load to the reconfigurable battery system 100. Examples of the electric vehicle 101 may include an electric or hybrid automobile, truck, motorcycle, aircraft, marine vessel, etc. As such, examples of the load 102 may include, for example, one or more electric motor drives or other electric loads. Moreover, instead of a vehicle, the load 102 may be substituted with a non-vehicle device that utilizes electric power and desires a quick-charging and high-efficiency discharging battery system. Examples of this type of non-vehicle device may include stationary loads such as, for example, a solar powered system on a building and/or home or portable electrical and/or electronic loads. The charging station 104 may be a power supply, a charging station for electric vehicles such as, for example, a quick charger for electric cars, a solar system on a building and/or home, or other similar power-providing devices. Additionally, the charging station 104 may also be, for example, an on-board station or a DC bus on the aircraft system.

The battery cell array 112 includes a plurality of battery cells and at least one switch between at least two battery cells of the plurality of battery cells where the plurality of battery cells is arranged into at least a first column of battery cells. In general, the battery cell array includes two (2) times N by M battery cells arranged in one column of battery cells or a plurality of columns of battery cells, where N is a number of battery cells in each column of the plurality of columns of battery cells, and M is a number of columns of battery cells. In this example, both N and M are equal to at least one, such that the smallest battery cell array 112 is a 2×1 array of battery cells.

As such, the battery cell array 122 includes a plurality of battery cells with at least one switch between each battery cell or between a group of battery cells. As an example, in the situation where a switch is between each battery cell, if the battery cell array 112 is configured as a 2×1 array of battery cells, the battery cell array 112 includes a single switch between the two battery cells that are arranged as a single column of battery cells. If instead the battery cell array 112 is configured as a 4×1 array of battery cells, the battery cell array 112 is arranged as a single column of battery cells having three switches between the four battery cells in the single column of battery cells. Also, if instead the battery cell array 112 is configured as a 2×3 array of battery cells, the battery cell array 112 is arranged as three columns of battery cells, where each column of battery cells has two battery cells within the column. In this example, each column of battery cells would have a single switch between the two battery cells in each column, resulting in the battery cell array 112 having a total of three switches (i.e., one per column of battery cells). Furthermore, if instead the battery cell array 112 is configured as a 4×5 array of battery cells, the battery cell array 112 is arranged as five columns of battery cells, where each column of battery cells has four battery cells within the column. In this example, each column of battery cells would have three switches between the four battery cells in each column, resulting in the battery cell array 112 having a total of fifteen (15) switches (i.e., three per column of battery cells).

In an alternative example, if the at least one switch is between a group of battery cells, the same previous description would apply but instead on an array of individual battery cells. The battery cell array 122 may include an array of individual groups of battery cells, where each group of battery cells acts as single combined battery cell module that may have a greater voltage than an individual battery cell. For ease of illustration and description in the present application, the term "battery cell" is used to represent either an individual battery cell (i.e., a single battery) or an individual battery cell module (i.e., a single combined battery cell module including multiple single batteries within the battery cell module).

In this example, the at least one switch of the battery cell array 112 and the bus switch 116 may be, for example, electronic, electromechanical, or mechanical switches. As an example, the bus switch may be a single-pole-double-throw (SPDT) switch configured to connect the battery cell array 112 to the normal voltage bus 106 or the high-voltage bus 110. Additionally, each switch of the battery cell array 112, between each battery cell in the battery cell array 112, may be, for example, a double-pole-double-throw (DPDT) switch.

The bus switch 116 is configured to electrically connect the battery cell array 112 to the normal voltage bus 106 when the battery cell array 112 is configured in either the first discharge mode or the second discharge mode. In this example, the first discharge mode is a mode of operation where the reconfigurable battery system 100 discharges power normally to the load 102. Moreover, the second discharge mode is a mode of operation where the reconfigurable battery system 100 discharges power in a high-efficiency discharge mode.

Specifically, the bus switch 116 includes a first switch BS1 and a second switch BS2 that act approximately simultaneously. In an example of operation when discharging, the reconfigurable battery system 100 transmits power to the load 102 when the first switch BS1 electrically connects the first battery terminal 118 to the normal voltage bus 106, and the second switch BS2 electrically connects the second battery terminal 119 to the load bus 108 of the load 102. As an example of operation when charging, the reconfigurable battery system 100 receives power from the charging station 104 when the first switch BS1 electrically connects the first battery terminal 118 to the high-voltage bus 110, and the second switch BS2 electrically connects the second battery terminal 119 to the negative bus 111 of the charging station 104.

It is appreciated by those of ordinary skill in the art that as batteries discharge, their battery voltages decrease and near the end of a battery's discharge capacity, the battery voltage can be as low as 40% of its voltage at a fully charged state. At this lower voltage, the battery current becomes large under a constant power load, and this increased current produces significantly more heat at the battery and at any equipment electrically connected to the battery, as compared to the heat produced when the battery voltage is higher and near the fully charged state of the battery.

The adverse effects of this increased heat production includes, for example, loss of energy resulting in lower battery efficiency, increased need for system cooling that requires the consumption of more power, increased equipment current ratings, and accelerated equipment degradation resulting in a shortened cycle life for the equipment. The reconfigurable battery system 100 addresses these problems by switching the discharge operation from the normal discharge mode when the battery cell array has a level of the state of charge that is above a predetermined value to the high-efficiency discharge mode when the battery cell array has a level of the state of charge that is below the predetermined value.

The high-efficiency discharge mode results in the battery cell array 112 producing a higher voltage and corresponding lower current while discharging at lower levels of the state of charge to the same load (i.e., the load 102). This produces the same amount of power that is delivered to the load 102 without correspondingly producing any additional heat when the battery cell array 112 has a level of the state of charge that is below the predetermined value.

In this example, when battery cell array 112 is configured in the first discharge mode (i.e., the normal discharge mode), the switch between each battery cell, within the battery cell array 112, is configured to electrically connect each battery cell in the first column of battery cells into a configuration that forms an electrical parallel connection between the first battery terminal and second battery terminal. In this configuration, each battery cell, of the first column of battery cells, is in parallel between the first battery terminal 118 and the second battery terminal 119. Additionally, if there are multiple columns of battery cells, each battery cell, of each of the columns of battery cells, are also in parallel between the first battery terminal 118 and the second battery terminal 119.

If instead, the battery cell array 112 is configured in the second discharge mode (i.e., the high-efficiency mode), the switch between each battery cell is configured to electrically connect each battery cell in the first column of battery cells into a configuration that forms an electrical series connection between the first battery terminal 118 and the second battery terminal 119. In this configuration, the electrical series connection includes all the battery cells of the first column of battery cells. Additionally, if there are multiple columns of battery cells, each battery cell, of each of the columns of battery cells, are also in series between the first battery terminal 118 and the second battery terminal 119.

In this example, when the reconfigurable battery system 100 is configured to operate in the charge mode, the bus switch 116 is configured to electrically connect the first battery terminal 118 of the battery cell array 112 to the high-voltage bus 110. When the battery cell array 112 is configured in the charge mode, similar to the configuration of the battery cell array 112 in the second discharge mode, the switch between each battery cell is configured to electrically connect each battery cell in the first column of battery cells into a configuration that forms an electrical series connection between the first battery terminal 118 and the second battery terminal 120. The electrical series connection includes all the battery cells of the first column of battery cells. Additionally, if there are multiple columns of battery cells, each battery cell, of each of the columns of battery cells, are also in series between the first battery terminal 118 and the second battery terminal 119.

In the charge mode configuration, the battery cell array 112 is configured to allow the columns of battery cells to be charged at a higher voltage (i.e., a high-voltage value) than would normally be possible if each individual battery cell were being charged separately at the voltage rating of the individual battery cells. It is appreciated by those of ordinary skill in the art that the voltage across the terminals of a plurality of battery cells that are electrically connected in series is equal to the total voltage of combination of the individual voltages of each battery cells. For example, if four battery cells are electrically connected in series and each battery cell has a voltage of 5 volts, the total voltage produced by the combination of the battery cells in series is 20 volts. As a result, the battery cell array 112 is capable of being charged at a higher voltage than the voltage rating of the individual battery cells. Since power is equal to the voltage multiplied by the current, the same amount of power may be delivered to the battery cell array 112 (i.e., charged) with a higher voltage and lower current value delivered to the battery cell array 112 from the charging station 104. Since the current is lower for the same amount of power, the battery cell array 112 may be charged with higher efficiency since the lower current generates less heat. This also results in the battery cell array 112 being charged in less time (i.e., faster) than the time required by conventional approaches, assuming the same available charging current limit of a charging station is applied. In this example, the number of battery cells arranged into columns of battery cells is directly related to a maximum charge voltage that may be utilized to efficiently and quickly charge the battery cell array 112. Utilizing this technique, the battery cell array 112 may configured to charge at twice, four times, six times, eight times, etc., the voltage rating of the individual battery cells. In general, the charging voltage may be increased by a factor of two times the number of battery cells in a column of battery cells. This technique also allows the battery cell array 112 to be charged with a higher amount of power because the configuration allows for the use of the same amount of current that is utilized in a normal charge process while utilizing a higher voltage than the rated voltage of the individual battery cells.

In this example, the controller 114 may be any type of controlling device such as a microprocessor, application-specific integrated circuit (ASIC), programmable gate array (PGA), logic circuit, or other similar device. The controller 114 is in signal communication with the at least one switch between each battery cell in the battery cell array 112 and the bus switch 116. The controller 114 may be configured to control the switch between each battery cell and the bus switch 116 based on the operation of the battery cell array 112 in the first discharge mode, the second discharge mode, or the charge mode. The controller 114 may also be configured to determine a level of the state of charge within the battery cell array 112 and select the first discharge mode or the second discharge mode in response to the level of the state of charge within the battery cell array 112.

The controller 114 may also be configured as a control system that includes a switch controller (not shown), battery system controller (not shown), and vehicle controller (not shown). These controllers may be separate devices, modules, or components or sub-components or modules of the controller 114. In general, the first switch BS1, the second switch BS2, and the switches within the battery cell array 112 are controlled by the switch controller that is a controller of the battery system controller. The battery system controller may receive command signals from the vehicle controller and other sensors within or associated with the reconfigurable battery system 100. As an example, the battery system controller may receive command signals that include voltage, current, state of charge, temperature, pressure, and other information related to the reconfigurable battery system 100, electric vehicle 101, and load 102.

It is appreciated by those of ordinary skill in the art that the circuits, components, modules, and/or devices of, or associated with, the reconfigurable battery system 100 are described as being in signal communication with each other, where signal communication refers to any type of communication and/or connection between the circuits, components, modules, and/or devices that allows a circuit, component, module, and/or device to pass and/or receive signals and/or information from another circuit, component, module, and/or device. The communication and/or connection may be along any signal path between the circuits, components, modules, and/or devices that allows signals and/or information to pass from one circuit, component, module, and/or device to another and includes wireless or wired signal paths. The signal paths may be physical, such as, for example, conductive wires, electromagnetic wave guides, cables, attached and/or electromagnetic or mechanically coupled terminals, semi-conductive or dielectric materials or devices, or other similar physical connections or couplings. Additionally, signal paths may be non-physical such as free-space (in the case of electromagnetic propagation) or information paths through digital components where communication information is passed from one circuit, component, module, and/or device to another in varying digital formats, without passing through a direct electromagnetic connection.

Figure 2:
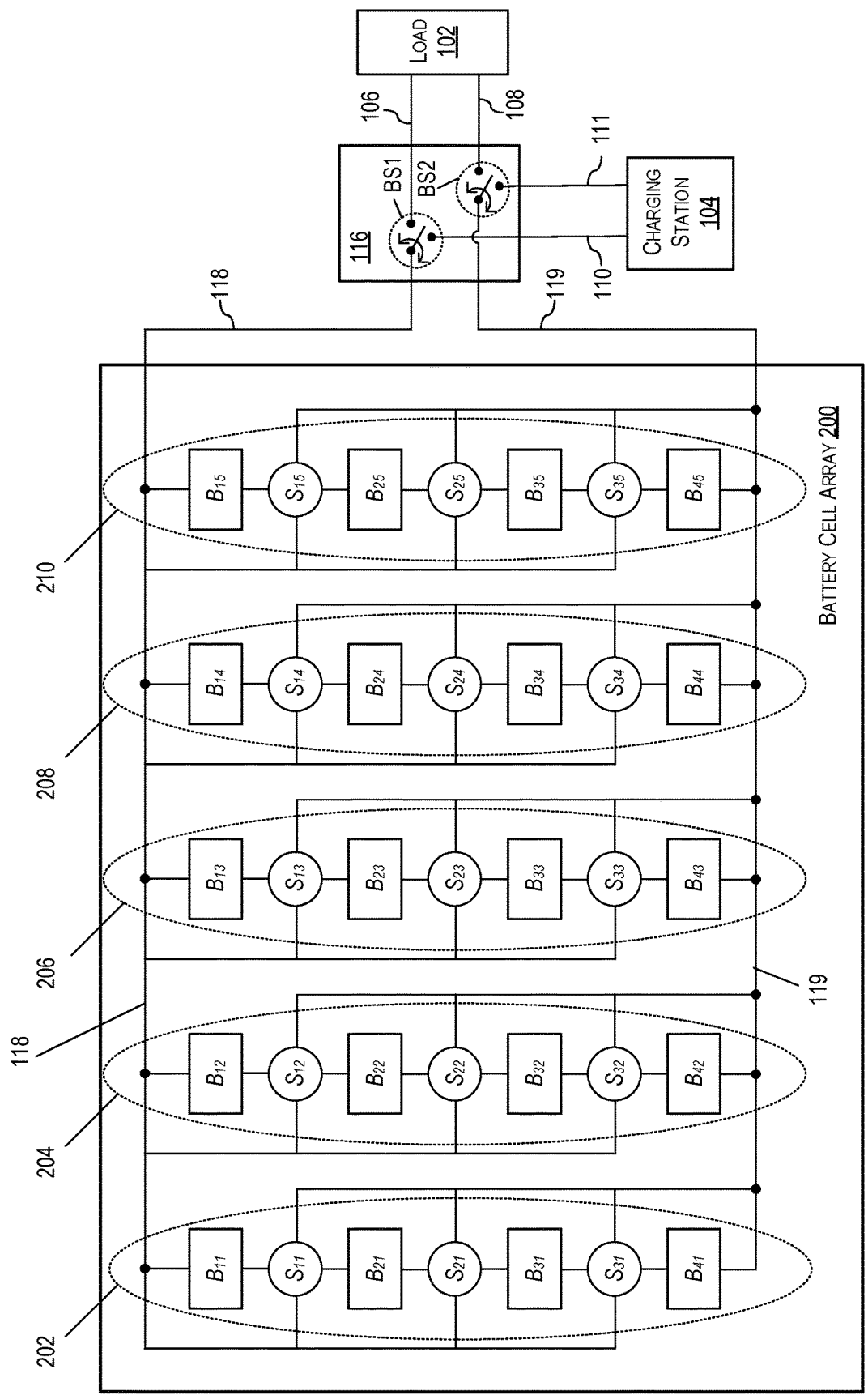
FIG. 2 is a system block diagram of an example of an implementation of a battery cell array of the reconfigurable battery system in accordance with the present disclosure.

In FIG. 2, a system block diagram of an example of an implementation of a battery cell array 200 of the reconfigurable battery system 100 is shown in accordance with the present disclosure. In this example, the battery cell array 200 is in signal communication with the bus switch 116, where the bus switch 116 is configured to select between the normal voltage bus 106 and the high-voltage bus 110. The battery cell array 200 includes the first battery terminal 118 and the second battery terminal 119. In this example, the battery cell array 200 is configured as a 4×5 array of battery cells that includes twenty (20) battery cells $B_{11}$, $B_{12}$, $B_{13}$, $B_{14}$, $B_{15}$, $B_{21}$, $B_{22}$, $B_{23}$, $B_{24}$, $B_{25}$, $B_{31}$, $B_{32}$, $B_{33}$, $B_{34}$, $B_{35}$, $B_{41}$, $B_{42}$, $B_{43}$, $B_{44}$, and $B_{45}$ and fifteen (15) switches $S_{11}$, $S_{12}$, $S_{13}$, $S_{14}$, $S_{15}$, $S_{21}$, $S_{22}$, $S_{23}$, $S_{24}$, $S_{25}$, $S_{31}$, $S_{32}$, $S_{33}$, $S_{34}$, and $S_{35}$, where each switch is electrically connected between adjacent battery cells in a column. In this example, the battery cell array 200 includes five (5) columns of battery cells. The first column of battery cells 202 includes battery cells $B_{11}$, $B_{21}$, $B_{31}$, and $B_{41}$ and switches $S_{11}$, $S_{21}$, and $S_{31}$. The second column of battery cells 204 includes $B_{12}$, $B_{22}$, $B_{32}$, and $B_{42}$ and $S_{12}$, $S_{22}$, and $S_{32}$. The third column of battery cells 206 includes $B_{13}$, $B_{23}$, $B_{33}$, and $B_{43}$ and $S_{13}$, $S_{23}$, and $S_{33}$. The fourth column of battery cells 208 includes $B_{14}$, $B_{24}$, $B_{34}$, and $B_{44}$ and $S_{14}$, $S_{24}$, and $S_{34}$. The fifth column of battery cells 210 includes $B_{15}$, $B_{25}$, $B_{35}$, and $B_{45}$ and $S_{15}$, $S_{25}$, and $S_{35}$. In this example, all the columns of battery cells 202, 204, 206, 208, and 210 are electrically connected between the first battery terminal 118 and the second battery terminal 119. As discussed earlier, each battery cell $B_{11}$, $B_{12}$, $B_{13}$, $B_{14}$, $B_{15}$, $B_{21}$, $B_{22}$, $B_{23}$, $B_{24}$, $B_{25}$, $B_{31}$, $B_{32}$, $B_{33}$, $B_{34}$, $B_{35}$, $B_{41}$, $B_{42}$, $B_{43}$, $B_{44}$, and $B_{45}$ may be an individual battery cell (i.e., an individual battery) or a battery cell module (i.e., an individual battery cell module including more than one battery cell in the module).

Figure 3A:
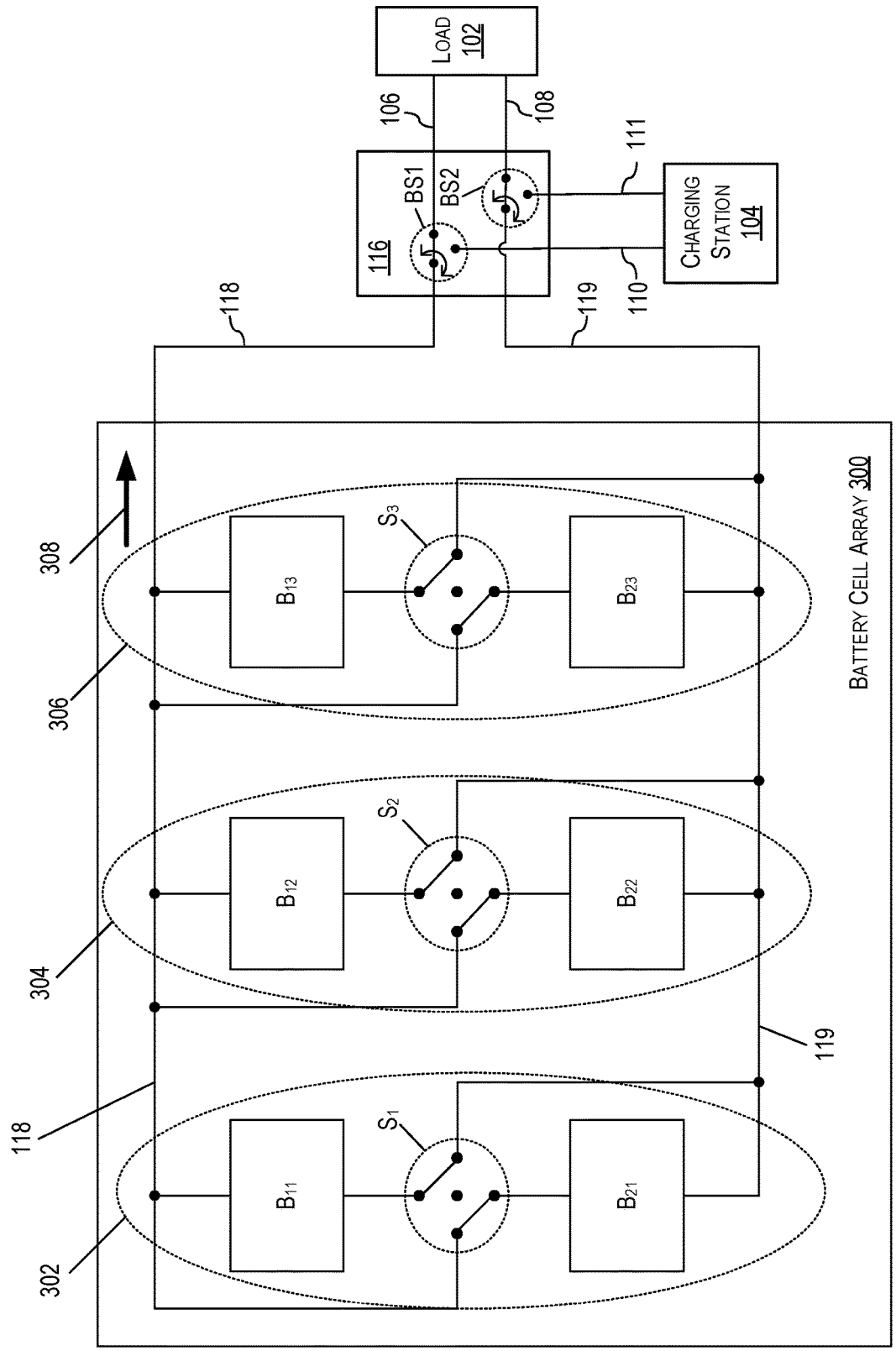
FIG. 3A is a system block diagram of an example of an implementation of a battery cell array of the reconfigurable battery system, in a first discharge mode in accordance with the present disclosure.
Figure 3B:
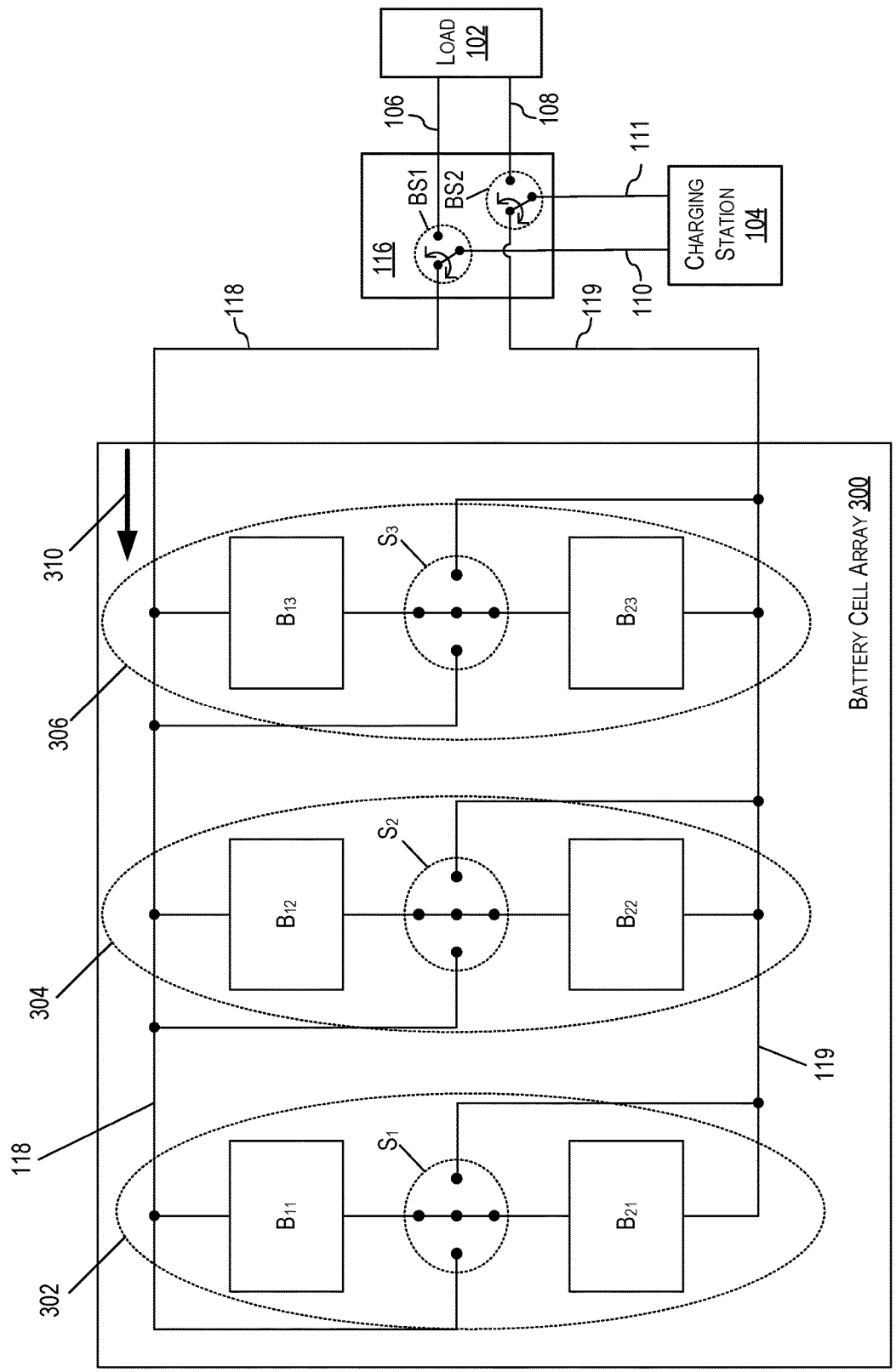
FIG. 3B is a system block diagram of an example of an implementation of the battery cell array of the reconfigurable battery system, in a charge mode in accordance with the present disclosure.
Figure 3C:
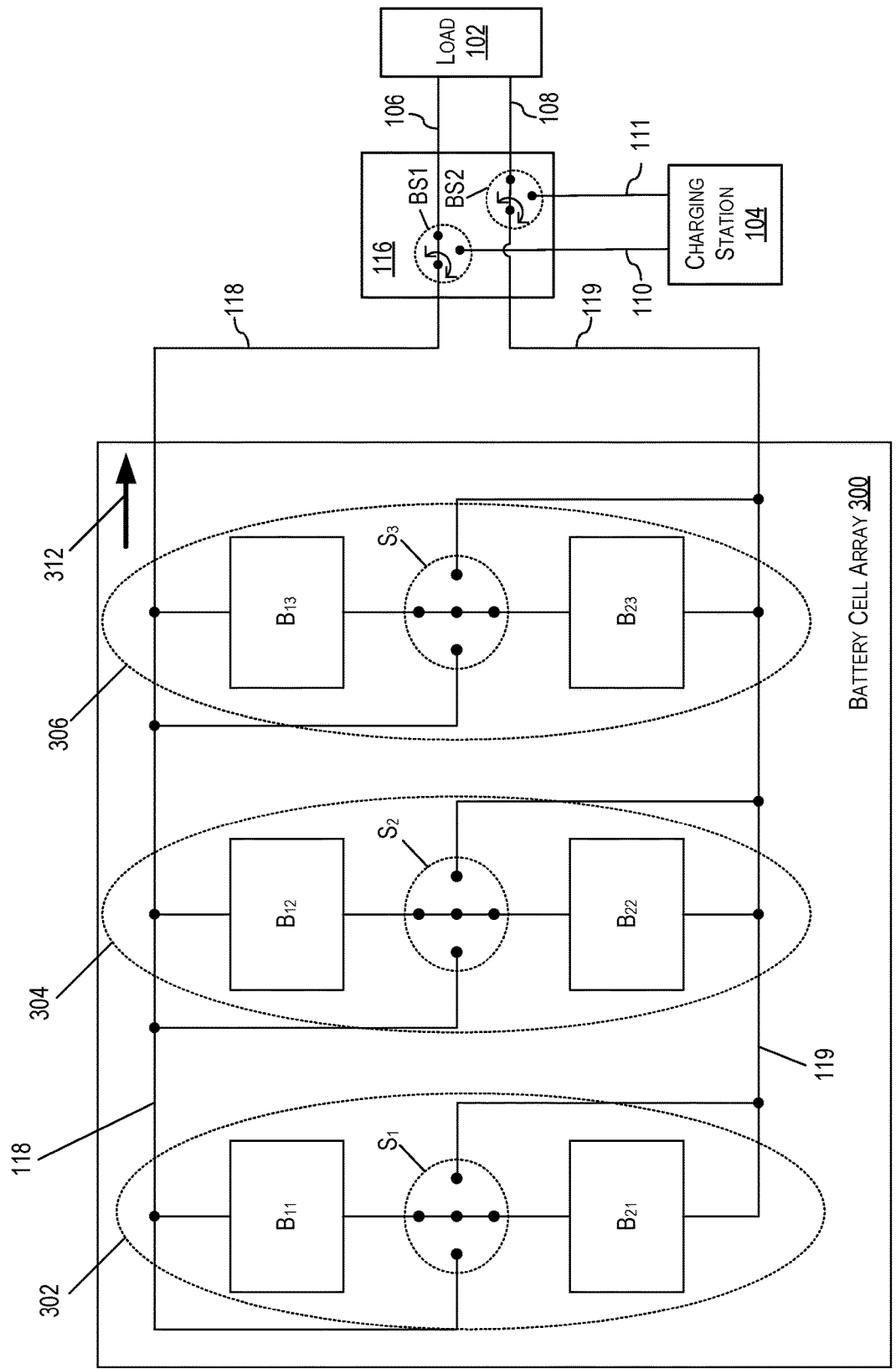
FIG. 3C is a system block diagram of an example of an implementation of a battery cell array of the reconfigurable battery system, in a second discharge mode in accordance with the present disclosure.

Turning to FIGS. 3A-3C, a system block diagram of an example of an implementation of another battery cell array 300 of the reconfigurable battery system 100 is shown in accordance with the present disclosure. As discussed earlier, the battery cell array 300 may include any number of battery cells and switches where, in general, the battery cell array 300 includes 2 times N times M battery cells arranged in one column of battery cells or a plurality of columns of battery cells, where N is a number of battery cells in each column of the plurality of columns of battery cells, and M is a number of columns of battery cells. Both N and M are equal to at least one (1) such that the smallest battery cell array 112 is a 2×1 array of battery cells. In this example, for ease of illustration, the battery cell array 300 is a 2×3 array of battery cells including battery cells $B_{11}$, $B_{21}$, $B_{22}$, $B_{22}$, $B_{13}$, and $B_{23}$ and switches $S_1$, $S_2$, and $S_3$. The battery cells $B_{11}$ and $B_{21}$ and switch $S_1$ are arranged in a first column 302 of battery cells, the battery cells Biz and $B_{22}$ and switch $S_2$ are arranged in a second column 304 of battery cells, and the battery cells $B_{13}$ and $B_{23}$ and switch $S_3$ are arranged in a third column 306 of battery cells. In this example, the bus switch 116 is a SPDT switch and each switch $S_1$, $S_2$, and $S_3$ of the battery cell array 112 is a DPDT switch.

In FIG. 3A, the battery cell array 300 is configured in the first discharge mode in accordance with the present disclosure. As discussed earlier, the first discharge mode may be a normal discharge mode where the battery cell array 300 produces an output power signal 308 that is equal to a voltage across the second battery terminal 119 and the first battery terminal 118 multiplied by the current produced by the battery cell array 300. This output power signal 308 is transmitted to the normal voltage bus 106 when the bus switch 116 electrically connects the first battery terminal 118 to the normal voltage bus 106 via the first switch BS1 and second battery terminal 119 to the load bus 108 via the second switch BS2. The output power signal 308 is then transmitted to the load 102.

In the first discharge mode, the switch $S_1$ between the battery cells $B_{11}$ and $B_{21}$ is configured to electrically connect each battery cell $B_{11}$ and $B_{21}$ in the first column 302 into a configuration that forms an electrical parallel connection between the first battery terminal 118 and the second battery terminal 119. Specifically, the battery cells $B_{11}$ and $B_{21}$ of the first column 302 are configured in parallel to each other between the first battery terminal 118 and the second battery terminal 119. Similarly, the second switch $S_2$ between the battery cells $B_{12}$ and $B_{22}$ is configured to electrically connect each battery cell $B_{12}$ and $B_{22}$ in the second column 304 into a configuration that forms an electrical parallel connection between the first battery terminal 118 and the second battery terminal 119. Moreover, third switch $S_3$ between the battery cells $B_{13}$ and $B_{23}$ is configured to electrically connect each battery cell $B_{13}$ and $B_{23}$ in the third column 306 into a configuration that forms an electrical parallel connection between the first battery terminal 118 and the second battery terminal 119.

The result is that every battery cell $B_{11}$, $B_{21}$, $B_{12}$, $B_{22}$, $B_{13}$, and $B_{23}$ is configured to be in parallel between the first battery terminal 118 and the second battery terminal 119. In this example, the discharge voltage at the normal voltage bus 106 would be equal to the rated voltage of the individual battery cells $B_{11}$, $B_{21}$, $B_{12}$, $B_{22}$, $B_{13}$, and $B_{23}$.

In FIG. 3B, the battery cell array 300 is configured in a charge mode in accordance with the present disclosure. As discussed earlier, the charge mode is an efficient charge mode that allows the battery cell array 300 to be charged efficiently and quickly utilizing a higher voltage than the voltage rating of the individual battery cell of the battery cell array 300.

In the charge mode, the bus switch 116 is configured to electrically connect the first battery terminal 118 of the battery cell array 300 to the high-voltage bus 110 where the battery cell array 300 is configured to charge at a high-voltage value. Specifically, in the charge mode, the battery cell array 300 receives a power signal 310 from the charging station 104 when the bus switch 116 electrically connects the first battery terminal 118 to the high-voltage bus 110 via the first switch BS1 and the second battery terminal 119 to the negative bus 111 via the second switch BS2.

In this example, the first switch $S_1$ between the battery cells $B_{11}$ and $B_{21}$ is configured to electrically connect the battery cells $B_{11}$ and $B_{21}$ in the first column 302 into a configuration that forms an electrical series connection between the first battery terminal 118 and the second battery terminal 119. Similarly, the second switch $S_2$ between the battery cells $B_{12}$ and $B_{22}$ is configured to electrically connect the battery cells $B_{12}$ and $B_{22}$ in the second column 304 into a configuration that forms an electrical series connection between the first battery terminal 118 and the second battery terminal 119. Moreover, the third switch $S_3$ between the battery cells $B_{13}$ and $B_{23}$ is configured to electrically connect the battery cells $B_{13}$ and $B_{23}$ in the third column 306 into a configuration that forms an electrical series connection between the first battery terminal 118 and the second battery terminal 119.

The result is that every battery cell of the columns is configured to be in series between the first battery terminal 118 and the second battery terminal 119. In this example, the charging voltage from the high-voltage bus 110 may be twice the rated voltage of the individual battery cells $B_{11}$, $B_{21}$, $B_{12}$, $B_{22}$, $B_{13}$, and $B_{23}$ allowing for the charging station 104 to use a higher voltage charging power signal 310 to charge the battery cell array 300 in less time than conventional charging methods at the same charging station current limit.

In FIG. 3C, the battery cell array 300 is configured in a second discharge mode in accordance with the present disclosure. As discussed earlier, the second discharge mode is a high-efficiency discharge mode where the battery cell array 300 produces a new output power signal 312 that is again equal to a voltage across the second battery terminal 119 and the first battery terminal 118 multiplied by the current produced by the battery cell array 300, where the voltage across the second battery terminal 119 and the first battery terminal 118 is higher than the voltage described in relation to FIG. 3A when the battery cell array 300 has a level of the state of charge that is below the predetermined value. This new output power signal 312 is transmitted to the normal voltage bus 106 when the bus switch 116 electrically connects the first battery terminal 118 to the normal voltage bus 106. The new output power signal 312 is then transmitted to the load 102.

As in the first discharge mode, for the second discharge mode, the bus switch 116 is configured to electrically connect the first battery terminal 118 of the battery cell array 300 to the high-voltage bus 110 where the battery cell array 300 is configured to charge at a high-voltage value. Again, the new output power signal 312 is transmitted to the normal voltage bus 106 when the bus switch 116 electrically connects the first battery terminal 118 to the normal voltage bus 106 via the first switch BS1 and second battery terminal 119 to the load bus 108 via the second switch BS2.

Similar to the first charge mode, in this example, the first switch $S_1$ between the battery cells $B_{11}$ and $B_{21}$ is configured to electrically connect the battery cells $B_{11}$ and $B_{21}$ in the first column 302 into a configuration that forms an electrical series connection between the first battery terminal 118 and the second battery terminal 119. Similarly, the second switch $S_2$ between the battery cells $B_{12}$ and $B_{22}$ is configured to electrically connect the battery cells $B_{12}$ and $B_{22}$ in the second column 304 into a configuration that forms an electrical series connection between the first battery terminal 118 and the second battery terminal 119. Moreover, the third switch $S_3$ between the battery cells $B_{13}$ and $B_{23}$ is configured to electrically connect the battery cells $B_{13}$ and $B_{23}$ in the third column 306 into a configuration that forms an electrical series connection between the first battery terminal 118 and the second battery terminal 119.

Again, the result is that every battery cell of the columns is configured to be in series between the first battery terminal 118 and the second battery terminal 119. In this example, the output voltage from the first battery terminal 118 may be as much as twice the available voltage of the individual battery cells $B_{11}$, $B_{21}$, $B_{12}$, $B_{22}$, $B_{13}$, and $B_{23}$ allowing for battery cell array 300 to provide a relatively constant new output power signal 312 to the load 102 as the level of the state charge of the battery cell array 300 drops below the predetermined value.

In these examples, the predetermined value of the level of the state of charge of the battery cell array 300 may be a percentage threshold of the fully charged state of the battery cell array 300. This percentage threshold may be predefined based on the design of the battery cells and/or the battery cell array 300.

In these configurations, the controller 114 is configured to control the switch between each pair of adjacent battery cells of each column and the bus switch 116 based on the operation of the battery cell array 300 in the first discharge mode, the second discharge mode, or the charge mode. The controller 114 is also configured to determine a level of the state of charge within the battery cell array 300 and select the first discharge mode or the second discharge mode in response to the level of the state of charge within the battery cell array 300.

Figure 4:
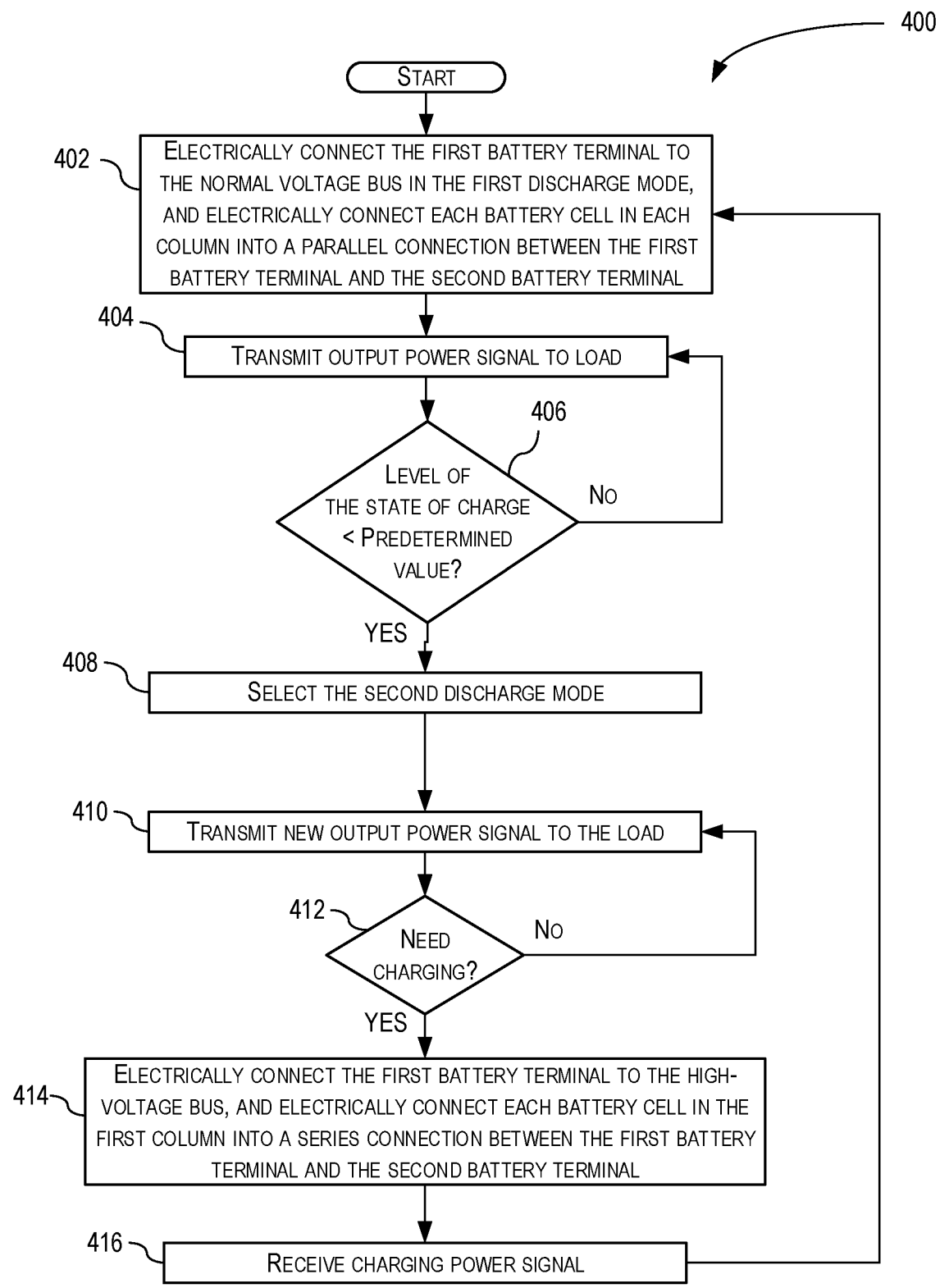
FIG. 4 is a flowchart of an example of an implementation of a method of operation of the reconfigurable battery system in accordance with the present disclosure.

Turning to FIG. 4, a flowchart of an example of an implementation of a method 400 of operation of the reconfigurable battery system 100 is shown in accordance with the present disclosure. The method 400 starts by electrically connecting 402 the first battery terminal 118 to the normal voltage bus 106 when the battery cell array 112, 200, or 300 is configured to operate in the first discharge mode and, approximately simultaneously, electrically connecting each battery cell in each column of battery cells into a configuration that forms an electrical parallel connection between the first battery terminal 118 and the second battery terminal 119, where each battery cell, of each column of battery cells, is in parallel between the first battery terminal 118 and second battery terminal 119. The method 400 then transmits 404 the output power signal 308 to the load 102 and monitors (via decision step 406) the level of the state of charge of the battery cell array 112, 200, or 300 to determine if the level of the state of charge falls below the predetermined value. If the level of the state of charge falls below the predetermined value, select 408 the second discharge mode. The method 400 then transmits 410 the new output power signal 312 to the load 102. The method 400 then determines (via decision step 412) if the battery cell array 112, 200, or 300 needs charging. If the battery cell array 112, 200, or 300 needs charging, the method 400 electrically connects 414 the first battery terminal to the high-voltage bus 110 and, approximately simultaneously, electrically connects each battery cell in the first column of battery cells into a configuration that forms an electrical series connection between the first battery terminal and second battery terminal, where the electrical series connection includes all the battery cells of the first column of battery cells. It is appreciated by those of ordinary skill that if the reconfigurable battery system 100 is already in the second discharge mode, only the first battery terminal 118 is connected to the high-voltage bus 110 because the battery cells of the battery cell array 112, 200, or 300 are already configured in a series connection. The method 400 then receives 416 the charging power signal 310 from the charging station 104 and charges the battery cell array 112, 200, or 300. The method 400 then returns to step 402 and method repeats.

If, in decision step 412, the battery cell array 112, 200, or 300 does not need charging, the method 400 returns to step 410 and continues to transmit the new output power signal 312 to the load 102 and the method 400 repeats. If, in decision step 406, the level of the state of charge does not fall below the predetermined value, the method 400 returns to step 404 and continues to transmit 404 the output power to the electric load and the method repeats.

Figure 5:
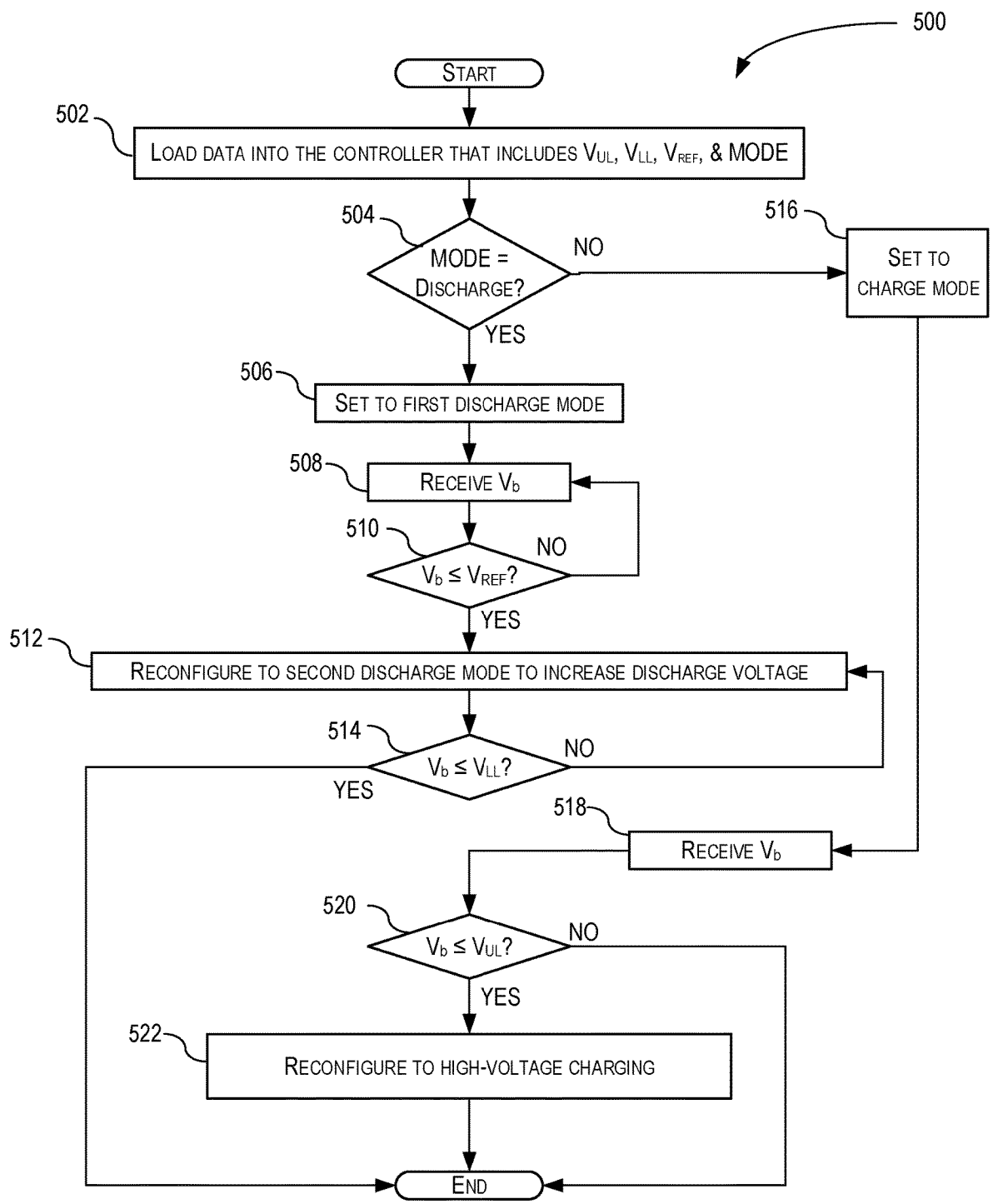
FIG. 5 is a flowchart of an example of an implementation of another method of operation of the reconfigurable battery system in accordance with the present disclosure.

In FIG. 5, a flowchart of an example of an implementation of another method 500 of operation of the reconfigurable battery system 100 is shown in accordance with the present disclosure. The method 500 starts by loading 502 data into the controller 114. The loaded data includes, for example, a reference voltage ($V_{ref}$) that is utilized to trigger reconfiguration of the reconfigurable battery system 100, a battery upper voltage limit ($V_{UL}$), a battery lower voltage limit ($V_{LL}$), and a mode of operation (MODE) where the MODE designates whether to charge or discharge the battery cell array 112, 200, or 300. The controller 114 then determines (in decision step 504) whether the MODE is in discharge mode. If the MODE is in discharge mode, the controller 114 sets 506 the battery cell array 112, 200, or 300 and bus switch 116 of the reconfigurable battery system 100 to the first discharge mode described earlier in regard to the example shown in FIG. 3A. The controller 114 then receives 508 a measured battery voltage ($V_b$) from a battery voltage sensor. The battery voltage sensor may be part of or associated with the reconfigurable battery system 100. The controller 114 then (in decision step 510) compares $V_b$ against $V_{REF}$ to determine if $V_b$ is less than or equal to $V_{REF}$. If $V_b$ is greater than $V_{REF}$, the controller 114 continues to maintain the reconfigurable battery system 100 in the first discharge mode and the method returns to step 508 where the $V_b$ is again measured.

If instead $V_b$ is less than or equal to $V_{REF}$, the controller 114 reconfigures 512 the battery cell array 112, 200, or 300 and bus switch 116 of the reconfigurable battery system 100 to the second discharge mode to increase the discharge voltage described earlier in regard to the example shown in FIG. 3B. The controller 114 then (in decision step 514) compares $V_b$ against $V_{LL}$ to determine if $V_b$ is less than or equal to $V_{LL}$. $V_{LL}$ is a cutoff voltage, and if $V_b$ is less than or equal to $V_{LL}$, the controller 114 stops discharging the battery cell array 112, 200, or 300, and the process ends.

If, instead the controller 114 determines (in decision step 504) that the MODE is not in discharge mode, the controller 114 sets 516 the battery cell array 112, 200, or 300 and bus switch 116 of the reconfigurable battery system 100 to the charge mode. Once in charge mode, the controller receives 518 the $V_b$ from a battery voltage sensor and compares (in decision step 520) $V_b$ against $V_{UL}$. If $V_b$ is less than or equal to $V_{UL}$, the controller 114 reconfigures 522 the battery cell array 112, 200, or 300 and bus switch 116 of the reconfigurable battery system 100 to high voltage charging as described earlier in regard to the example shown in FIG. 3C. After charging, the method ends.

If, instead the controller 114 determines (in decision step 520) that $V_b$ is greater than $V_{UL}$, the controller 114 stops charging the battery cell array 112, 200, or 300 and the process ends.

It will be understood that various aspects or details of the disclosure may be changed without departing from the scope of the disclosure. It is not exhaustive and does not limit the claimed disclosures to the precise form disclosed. Furthermore, the foregoing description is for the purpose of illustration only, and not for the purpose of limitation. Modifications and variations are possible in light of the above description or may be acquired from practicing the disclosure. The claims and their equivalents define the scope of the disclosure. Moreover, although the techniques have been described in language specific to structural features and/or methodological acts, it is to be understood that the appended claims are not necessarily limited to the features or acts described. Rather, the features and acts are described as example implementations of such techniques.

Further, the disclosure comprises embodiments according to the following clauses.

Clause 1. A reconfigurable battery system comprising: a battery cell array configured to operate in a first discharge mode, a second discharge mode, and a charge mode, wherein the battery cell array includes: a plurality of battery cells arranged as at least a first column of battery cells between a first battery terminal and a second battery terminal; and a switch between each battery cell within the first column of battery cells; and a bus switch in signal communication with the battery cell array at the first battery terminal, wherein the bus switch is configured to select between electrically connecting the first battery terminal to a normal voltage bus or a high-voltage bus.

Clause 2. The reconfigurable battery system of clause 1, wherein the bus switch is a single-pole-double-throw (SPDT) switch.

Clause 3. The reconfigurable battery system of clause 1, wherein the switch between each battery cell is a double-pole-double-throw (DPDT) switch.

Clause 4. The reconfigurable battery system of clause 1, further comprising: a controller in signal communication with the switch between each battery cell and the bus switch; wherein the controller is configured to: control the switch between each battery cell and the bus switch based on the operation of the battery cell array in the first discharge mode, the second discharge mode, or the charge mode; determine a level of a state of charge within the battery cell array; and select the first discharge mode or the second discharge mode in response to the level of the state of charge within the battery cell array.

Clause 5. The reconfigurable battery system of clause 1, wherein the bus switch is configured to electrically connect the battery cell array to the normal voltage bus when the battery cell array is configured in the first discharge mode or the second discharge mode.

Clause 6. The reconfigurable battery system of clause 5, wherein: the battery cell array is configured in the first discharge mode; and the switch between each battery cell electrically connects each battery cell in the first column of battery cells into a configuration that forms an electrical parallel connection between the first battery terminal and the second battery terminal.

Clause 7. The reconfigurable battery system of clause 5, wherein: the battery cell array is configured in the second discharge mode; and the switch between each battery cell electrically connects each battery cell in the first column of battery cells into a configuration that forms an electrical series connection between the first battery terminal and the second battery terminal.

Clause 8. The reconfigurable battery system of clause 1, wherein the bus switch is configured to electrically connect the battery cell array to the high-voltage bus when the battery cell array is configured to charge at a high-voltage value.

Clause 9. The reconfigurable battery system of clause 8, wherein the switch between each battery cell electrically connects each battery cell in the first column of battery cells into a configuration that forms an electrical series connection between the first battery terminal and the second battery terminal.

Clause 10. A reconfigurable battery system comprising: a battery cell array configured to operate in a first discharge mode, a second discharge mode, and a charge mode, wherein the battery cell array includes: a plurality of battery cells arranged as a plurality of columns of battery cells between a second battery terminal and a first battery terminal; and a switch between each battery cell within each column of the plurality of columns of battery cells; and a bus switch in signal communication with the battery cell array at the first battery terminal, wherein the bus switch is configured to select between electrically connecting the first battery terminal to a normal voltage bus or a high-voltage bus.

Clause 11. The reconfigurable battery system of clause 10, wherein: the battery cell array includes 2 times N times M battery cells; N is a number of battery cells in each column of the plurality of columns of battery cells; and M is a number of columns of battery cells.

Clause 12. The reconfigurable battery system of clause 10, further comprising a controller in signal communication with the switch between each battery cell and the bus switch, wherein the controller is configured to control the switch between each battery cell and the bus switch based on the operation of the battery cell array in the first discharge mode, the second discharge mode, or the charge mode.

Clause 13. The reconfigurable battery system of clause 10, wherein the bus switch is configured to electrically connect the battery cell array to the normal voltage bus when the battery cell array is configured in the first discharge mode or the second discharge mode.

Clause 14. The reconfigurable battery system of clause 13, wherein: the battery cell array is configured in the first discharge mode; and the switch between each battery cell electrically connects each battery cell in each column of the plurality of columns of battery cells into a configuration that forms an electrical parallel connection between the first battery terminal and second battery terminal.

Clause 15. The reconfigurable battery system of clause 13, wherein: the battery cell array is configured in the second discharge mode; the switch between each battery cell electrically connects each battery cell in each column of the plurality of columns of battery cells into a configuration that forms a plurality of electrical series connections between the first battery terminal and the second battery terminal.

Clause 16. The reconfigurable battery system of clause 10, wherein the bus switch is configured to electrically connect the battery cell array to the high-voltage bus when the battery cell array is configured to charge at a high-voltage value.

Clause 17. The reconfigurable battery system of clause 16, wherein the switch between each battery cell electrically connects each battery cell in each column of the plurality of columns of battery cells into a configuration that forms a plurality of electrical series connections between the first battery terminal and the second battery terminal.

Clause 18. A method for charging or discharging a reconfigurable battery system having a battery cell array configured to operate in a first discharge mode, a second discharge mode, or a charge mode, wherein the battery cell array has a plurality of battery cells arranged as at least a first column of battery cells between a first battery terminal and a second battery terminal, the method comprising: when the battery cell array is configured to operate in the first discharge mode, electrically connecting the first battery terminal to a normal voltage bus and electrically connecting each battery cell in the first column of the battery cells into a configuration that forms an electrical parallel connection between the first battery terminal and the second battery terminal, wherein each battery cell, of the first column of battery cells, is in parallel between the first battery terminal and the second battery terminal; when the battery cell array is configured to operate in the second discharge mode, electrically connecting the first battery terminal to the normal voltage bus and electrically connecting each battery cell in the first column of the battery cells into a configuration that forms an electrical series connection between the first battery terminal and the second battery terminal, wherein the electrical series connection includes all the battery cells of the first column of battery cells; and when the battery cell array is configured to operate in the charge mode, electrically connecting the first battery terminal to a high-voltage bus and electrically connecting each battery cell in the first column of battery cells into a configuration that forms an electrical series connection between the first battery terminal and the second battery terminal, wherein the electrical series connection includes all the battery cells of the first column of battery cells.

Clause 19. The method of clause 18, wherein electrically connecting each battery cell in the first column of battery cells into a configuration that forms an electrical series connection between the first battery terminal and the second battery terminal includes: determining a level of a state of charge within the battery cell array; and selecting the second discharge mode in response to the level of the state of charge being below or equal to a predetermined value.

Clause 20. The method of clause 19, further including transmitting a new output power signal to the load, wherein electrically connecting the first battery terminal to a high-voltage bus and electrically connecting each battery cell in the first column of battery cells into a configuration that forms an electrical series connection between the first battery terminal and the second battery terminal includes: determining if the battery cell array needs charging; and selecting the charge mode in response to determining that the battery cell array needs charging.

To the extent that terms "includes," "including," "has," "contains," and variants thereof are used herein, such terms are intended to be inclusive in a manner similar to the term "comprises" as an open transition word without precluding any additional or other elements. Moreover, conditional language such as, among others, "can," "could," "might," or "may," unless specifically stated otherwise, are understood within the context to present that certain examples include, while other examples do not include, certain features, elements, and/or steps. Thus, such conditional language is not generally intended to imply that certain features, elements, and/or steps are in any way required for one or more examples or that one or more examples necessarily include logic for deciding, with or without user input or prompting, whether certain features, elements, and/or steps are included or are to be performed in any particular example. Conjunctive language such as the phrase "at least one of X, Y, or Z," unless specifically stated otherwise, is to be understood to present that an item, term, etc., may be either X, Y, or Z, or a combination thereof.

What is claimed:

1. A reconfigurable battery system comprising:
   a battery cell array configured to operate in a first discharge mode, a second discharge mode, and a charge mode, wherein the battery cell array includes:
      a plurality of battery cells arranged as one or more columns of battery cells electrically connected to a first battery terminal and a second battery terminal; and
      switches, wherein the switches include a switch between each two adjacent battery cells within a first column of the one or more columns of battery cells;
   a normal voltage bus and a load bus configured to be connected to a load in the first discharge mode and the second discharge mode;
   a high voltage bus and a negative bus configured to be connected to a charging station in the charge mode;
   a bus switch in signal communication with the battery cell array at the first battery terminal and the second battery terminal, wherein the bus switch is configured to change between electrically connecting the first battery terminal and the second battery terminal to:
      the normal voltage bus and the load bus in the first discharge mode and the second discharge mode, and
      the high voltage bus and the negative bus in the charge mode; and
   a controller in signal communication with the switches and the bus switch, wherein the controller is configured to:
      set the bus switch to a particular position;
      set the switches to provide the first discharge mode, the second discharge mode, or the charge mode;
      determine a level of a state of charge within the battery cell array during a discharge operation;
      monitor a discharge voltage of the battery cell array during the discharge operation; and
      transition the battery cell array from the first discharge mode to the second discharge mode in response to the level of the state of charge being below or equal to a predetermined value, wherein:
         the predetermined value is dynamically adjusted based on operating conditions of the load,
         in the first discharge mode, the controller controls the switch between each two adjacent battery cells of the first column to electrically connect each battery cell of the first column into a parallel configuration between the first battery terminal and the second battery terminal,
         in the second discharge mode, the controller controls the switch between each two adjacent battery cells of the first column to electrically connect each battery cell of the first column into a series configuration between the first battery terminal and the second battery terminal to increase a voltage provided by the reconfigurable battery system while maintaining equivalent power to the load; and
         in the charge mode, the controller controls the switch between each two adjacent battery cells of the first column to electrically connect each battery cell of the first column into the series configuration to enable fast charging of the battery cell array at a higher voltage than individual battery cell ratings.

2. The reconfigurable battery system of claim 1, wherein the bus switch is a single-pole-double-throw (SPDT) switch.

3. The reconfigurable battery system of claim 1, wherein the switch between each two adjacent battery cells is a double-pole-double-throw (DPDT) switch.

4. The reconfigurable battery system of claim 1, wherein in response to transitioning to the second discharge mode, the battery cell array is configured to provide a new output power signal to the load at a higher voltage and lower current than the output power signal while maintaining equivalent power to the load.

5. The reconfigurable battery system of claim 1, wherein:
the one or more columns includes the first column and a second column of battery cells electrically connected to the first battery terminal and the second battery terminal; and
the switches includes a second switch between each two adjacent battery cells of the second column of battery cells, each second switch being directly connected to the two adjacent battery cells, the first battery terminal, and the second battery terminal.

6. The reconfigurable battery system of claim 5, wherein in the first discharge mode, the second switch between each two adjacent battery cells of the second column of battery cells electrically connects each battery cell of the second column of battery cells into a parallel configuration between the first battery terminal and the second battery terminal.

7. The reconfigurable battery system of claim 5, wherein in the second discharge mode, the second switch between each two adjacent battery cells of the second column of battery cells electrically connects each battery cell of the second column of battery cells into a series configuration between the first battery terminal and the second battery terminal.

8. The reconfigurable battery system of claim 1, wherein the first column of battery cells comprises three or more battery cells.

9. The reconfigurable battery system of claim 1, wherein the operating conditions of the load include at least one of: power demand of the load, temperature of the battery cells, and voltage requirements of the load.

10. A method for charging or discharging a reconfigurable battery, the method comprising:
configuring a battery cell array to operate in a first discharge mode, a second discharge mode, and a charge mode, wherein the battery cell array includes a plurality of battery cells arranged as one or more columns of battery cells electrically connected to a first battery terminal and a second battery terminal;
connecting, via a bus switch, the first battery terminal to a normal voltage bus and the second battery terminal to a load bus to provide power to a load;
monitoring a level of a state of charge and a discharge voltage of the battery cell array during operation in the first discharge mode, wherein in the first discharge mode each battery cell in a first column of the one or more columns is connected in a parallel configuration between the first battery terminal and the second battery terminal;
dynamically adjusting a predetermined value based on operating conditions of the load;
determining that the level of the state of charge has fallen below a predetermined value; and
in response to determining that the level of the state of charge has fallen below the predetermined value:
transitioning the battery cell configuration from the first discharge mode to the second discharge mode by reconfiguring the battery cells in the first column from the parallel configuration to a series configuration between the first battery terminal and the second battery terminal; and
wherein the transition from the first discharge mode to the second discharge mode increases a voltage provided by the reconfigurable battery while maintaining equivalent power to the load; and
wherein configuring the battery cell array in the charge mode by connecting the battery cells in the first column in the series configuration to enable fast charging of the battery cell array at a higher voltage than individual battery cell ratings.

11. The method of claim 10, further comprising:
in response to determining that the battery cell array is operating in the first discharge mode, controlling switches between each two adjacent battery cells of the first column of the one or more columns to electrically connect each battery cell of the first column into the parallel configuration between the first battery terminal and the second battery terminal.

12. The method of claim 10, further comprising: in response to determining that the battery cell array is operating in the second discharge mode controlling the switches to electrically connect each battery cell of the first column into the series configuration between the first battery terminal and the second battery terminal.

13. A vehicle power system comprising:
an electric motor configured to propel a vehicle;
a reconfigurable battery system for powering the electric motor, the reconfigurable battery system comprising:
a battery cell array configured to operate in a first discharge mode, a second discharge mode, and a charge mode, wherein the battery cell array includes:
a plurality of battery cells arranged as one or more columns of battery cells electrically connected to a first battery terminal and a second battery terminal; and
switches, wherein the switches include a switch between each two adjacent battery cells within a first column of the one or more columns of battery cells;
a normal voltage bus and a load bus configured to connect the battery cell array to the electric motor in the first discharge mode and the second discharge mode;
a high voltage bus and a negative bus configured to be connected to a charging station in the charge mode;
a bus switch in signal communication with the battery cell array at the first battery terminal and the second battery terminal, wherein the bus switch is configured to change between electrically connecting the first battery terminal and the second battery terminal to:
the normal voltage bus and the load bus in the first discharge mode and the second discharge mode, and
the high voltage bus and the negative bus in the charge mode; and
a controller in signal communication with the switches and the bus switch, wherein the controller is configured to:
set the bus switch to a particular position;

set the switches to provide the first discharge mode, the second discharge mode, or the charge mode;

determine a level of a state of charge within the battery cell array during a vehicle operation;

monitor a discharge voltage of the battery cell array during the vehicle operation;

transmit a notification to a vehicle control system prior to transitioning the battery cell array from the first discharge mode to the second discharge mode; and transition the battery cell array from the first discharge mode to the second discharge mode in response to the level of the state of charge being below or equal to a predetermined value, wherein the predetermined value is dynamically adjusted based on a power demand of the electric motor, wherein:

in the first discharge mode, the controller controls the switch between each two adjacent battery cells of the first column to electrically connect each battery cell of the first column into a parallel configuration between the first battery terminal and the second battery terminal, in the second discharge mode, the controller controls the switch between each two adjacent battery cells of the first column to electrically connect each battery cell of the first column into a series configuration between the first battery terminal and the second battery terminal to increase a voltage provided by the reconfigurable battery system while maintaining equivalent power to the electric motor, and in the charge mode, the controller controls the switch between each two adjacent battery cells of the first column to electrically connect each battery cell of the first column into the series configuration to enable fast charging of the battery cell array.

14. The vehicle power system of claim 13, wherein the vehicle is an aircraft and the electric motor is configured to power one or more propellers of the aircraft.

15. The vehicle power system of claim 13, wherein the notification transmitted to the vehicle control system includes information about an expected change in power delivery characteristics during the transition.

16. The vehicle power system of claim 13, wherein:

the one or more columns includes the first column and a second column of battery cells electrically connected to the first battery terminal and the second battery terminal; and the switches includes a second switch between each two adjacent battery cells of the second column of battery cells, each second switch being directly connected to the two adjacent battery cells, the first battery terminal, and the second battery terminal.

17. The vehicle power system of claim 16, wherein in the second discharge mode, the second switch between each two adjacent battery cells of the second column of battery cells electrically connects each battery cell of the second column of battery cells into a series configuration between the first battery terminal and the second battery terminal.

18. The vehicle power system of claim 13, further comprising a battery management system that monitors temperature of the battery cells and wherein the controller is further configured to adjust the predetermined value based on the temperature of the battery cells.

19. The vehicle power system of claim 13, wherein the fast charging in the charge mode allows the battery cell array to be charged in less time than conventional charging methods at the same charging station current limit.

20. The vehicle power system of claim 13, wherein the higher voltage in the charge mode is at least twice the voltage rating of individual battery cells in the first column.

* * * * *